United States Patent
Lin et al.

(10) Patent No.: US 12,078,182 B2
(45) Date of Patent: Sep. 3, 2024

(54) DIRECT CURRENT INDUCED DRAFT FAN

(71) Applicant: Zhongshan Broad-Ocean Motor Co., Ltd., Zhongshan (CN)

(72) Inventors: Yanhu Lin, Zhongshan (CN); Wei Wang, Zhongshan (CN); Zhicheng Liang, Zhongshan (CN); Xiaolei Kang, Zhongshan (CN); Miao Zhang, Zhongshan (CN); Jianwei Zha, Zhongshan (CN); Zhihan Wu, Zhongshan (CN)

(73) Assignee: ZHONGSHAN BROAD-OCEAN MOTOR CO., LTD., Zhongshan (CN)

( * ) Notice: Subject to any disclaimer, the term of this patent is extended or adjusted under 35 U.S.C. 154(b) by 164 days.

(21) Appl. No.: 17/841,650

(22) Filed: Jun. 15, 2022

(65) Prior Publication Data
US 2022/0307507 A1    Sep. 29, 2022

Related U.S. Application Data

(63) Continuation-in-part of application No. PCT/CN2021/079553, filed on Mar. 8, 2021.

(30) Foreign Application Priority Data

Dec. 17, 2020    (CN) .......................... 202023048756.3

(51) Int. Cl.
| | |
|---|---|
| *F04D 25/06* | (2006.01) |
| *F04D 29/44* | (2006.01) |
| *F04D 29/62* | (2006.01) |
| *H02K 5/22* | (2006.01) |
| *H02K 11/33* | (2016.01) |

(52) U.S. Cl.
CPC ....... *F04D 25/068* (2013.01); *F04D 25/0693* (2013.01); *F04D 29/441* (2013.01); *F04D 29/624* (2013.01); *H02K 5/22* (2013.01); *H02K 11/33* (2016.01)

(58) Field of Classification Search
CPC .. F04D 25/068; F04D 25/0693; F04D 29/441; F04D 29/624; F04D 17/16; F04D 29/5813; F04D 29/62; H02K 5/22; H02K 11/33; H02K 5/207; H02K 7/14; H02K 9/06
USPC ........................................................ 417/424.1
See application file for complete search history.

(56) References Cited

U.S. PATENT DOCUMENTS

| | | | | |
|---|---|---|---|---|
| 2,910,003 | A | * | 10/1959 | Kaatz ................. F04D 15/0218 417/18 |
| 4,588,912 | A | * | 5/1986 | Shinmura .............. H02K 29/08 310/43 |

(Continued)

*Primary Examiner* — Devon C Kramer
*Assistant Examiner* — Benjamin Doyle
(74) *Attorney, Agent, or Firm* — MATTHIAS SCHOLL P.C.; Matthias Scholl

(57) ABSTRACT

A direct current induced draft fan includes: a volute, a wind wheel, a motor, and a locking assembly. The motor includes a motor body and a motor controller. The motor is disposed on the top of the volute, and the wind wheel is disposed in the volute. The motor is configured to drive the wind wheel to rotate. The motor controller is disposed on one side of the motor body and is fixed on the motor body through the locking assembly. The side wall of the motor controller extends from the motor body towards the volute.

6 Claims, 10 Drawing Sheets

(56) References Cited

U.S. PATENT DOCUMENTS

| | | | | |
|---|---|---|---|---|
| 4,773,829 | A * | 9/1988 | Vettori | F04D 17/16 310/68 R |
| 4,883,982 | A * | 11/1989 | Forbes | H02K 9/06 310/67 R |
| 5,119,466 | A * | 6/1992 | Suzuki | H02K 11/33 310/68 R |
| 5,971,725 | A * | 10/1999 | de Simon | F04D 25/068 417/423.4 |
| 6,200,108 | B1 * | 3/2001 | Caudill | F04D 29/5806 165/47 |
| 6,929,448 | B1 * | 8/2005 | Lyons | F04D 27/003 415/206 |
| 7,196,439 | B2 * | 3/2007 | Pierret | H02K 9/225 310/58 |
| 8,267,674 | B2 * | 9/2012 | Czulak | F04D 25/082 417/370 |
| 8,801,406 | B2 * | 8/2014 | Liu | F04D 25/06 417/423.15 |
| 10,851,793 | B2 * | 12/2020 | Byeon | F04D 25/0613 |
| 2003/0035735 | A1 * | 2/2003 | Wang | F04D 29/083 417/234 |
| 2005/0047945 | A1 * | 3/2005 | Metzger | F04D 29/668 417/423.15 |
| 2006/0093500 | A1 * | 5/2006 | Liang | F04D 29/5806 417/423.1 |
| 2008/0075612 | A1 * | 3/2008 | Hsu | F04D 25/0606 310/68 R |
| 2008/0219838 | A1 * | 9/2008 | Kusano | F01D 1/02 415/203 |
| 2010/0068987 | A1 * | 3/2010 | Lin | F04D 25/068 454/341 |
| 2011/0229358 | A1 * | 9/2011 | Streng | F04D 25/082 417/423.14 |
| 2012/0051904 | A1 * | 3/2012 | Hagen | B62K 11/02 415/224 |
| 2014/0265663 | A1 * | 9/2014 | Chamberlin | H02K 9/223 310/58 |
| 2015/0022063 | A1 * | 1/2015 | Lei | H02K 29/08 310/68 B |
| 2015/0098838 | A1 * | 4/2015 | Tang | F04D 27/00 417/44.1 |
| 2016/0149473 | A1 * | 5/2016 | Wang | H02K 5/15 310/64 |
| 2016/0285339 | A1 * | 9/2016 | Smith | H02K 5/22 |
| 2017/0126096 | A1 * | 5/2017 | Capoulun | H02K 5/15 |
| 2018/0045219 | A1 * | 2/2018 | Li | F04D 29/70 |
| 2018/0313365 | A1 * | 11/2018 | Salvi | H02K 5/225 |
| 2019/0226491 | A1 * | 7/2019 | Kanai | F04D 29/051 |
| 2021/0025407 | A1 * | 1/2021 | Sun | F04D 19/04 |

* cited by examiner

DIRECT CURRENT INDUCED DRAFT FAN

CROSS-REFERENCE TO RELATED APPLICATIONS

This application is a continuation-in-part of International Patent Application No. PCT/CN2021/079553 with an international filing date of Mar. 8, 2021, designating the United States, now pending, and further claims foreign priority benefits to Chinese Patent Application No. 202023048756.3 filed Dec. 17, 2020. The contents of all of the aforementioned applications, including any intervening amendments thereto, are incorporated herein by reference. Inquiries from the public to applicants or assignees concerning this document or the related applications should be directed to: Matthias Scholl P.C., Attn.: Dr. Matthias Scholl Esq., 245 First Street, 18th Floor, Cambridge, MA 02142.

BACKGROUND

The disclosure relates to a direct current induced draft fan.

Conventionally, a direct current induced draft fan includes a volute, a wind wheel, and a motor. The motor is disposed on one side of the volute. The motor includes a motor body and a motor controller. The motor body includes a stator assembly, a permanent magnet rotor assembly, a rotating shaft, and a housing. The wind wheel is installed in the volute. The motor drives the wind wheel to rotate. The motor controller includes a control box and a control circuit board installed in the control box. The control box is installed at the tail of the housing, that is, the motor controller is stacked on the motor body. This structure leads to a long axial length of the induced draft fan, which occupies a large space, and brings inconvenience to the connection of a load with the induced draft fan.

SUMMARY

The disclosure provides a direct current induced draft fan, comprising: a volute, a wind wheel, a motor, and a locking assembly; the motor comprises a motor body and a motor controller. The motor is disposed on a top of the volute, and the wind wheel is disposed in the volute; the motor is configured to drive the wind wheel to rotate; the motor controller is disposed on one side of the motor body and is fixed on the motor body through the locking assembly; and a side wall of the motor controller extends from the motor body towards the volute.

In a class of this embodiment, the motor body comprises a stator assembly, a rotor assembly, a rotating shaft, and a housing; the rotor assembly is disposed on the rotating shaft; the stator assembly is nested in the housing; the rotor assembly is nested in the stator assembly; the housing comprises an end cover on one end; and the motor controller is fixed on the end cover through the locking assembly.

In a class of this embodiment, the motor controller comprises a control box and a control circuit board disposed in the control box; the control box comprises an end plate and a side plate extending from an outer edge of the end plate along an axial direction of the rotating shaft; the end plate is fixed on the end cover through the locking assembly; and the side plate extends in a direction from the end cover to the volute.

In a class of this embodiment, the side plate comprises an inner plate, an outer plate, a first side plate, and a second side plate; the first side plate is disposed between the inner plate and the outer plate and connects a first end of the inner plate and a first end of the outer plate; the second side plate is disposed between the inner plate and the outer plate and connects a second end of the inner plate and a second end of the outer plate; the end plate, the inner plate, the outer plate, the first side plate, and the second side plate form a cavity; and the control circuit board is disposed in the cavity and fixed on the end plate.

In a class of this embodiment, the inner plate comprises an inner arc segment and two inner linear segments respectively disposed on two ends of the inner arc segment; the housing further comprises a cylindrical body, and the end cover is disposed on one end of the cylindrical body; and the inner arc segment abuts against the cylindrical body.

In a class of this embodiment, the outer plate comprises an outer arc segment and two outer linear segments respectively disposed on two ends of the outer arc segment; and the outer plate surrounds the inner plate.

In a class of this embodiment, the end plate comprises two mounting brackets; the two mounting brackets protrude from the inner plate; each mounting bracket comprises a mounting hole; the locking assembly comprises a plurality of bolts and a plurality of nuts in threaded connection to the plurality of bolts; to fix the control box on the housing, two bolts pass through two mounting holes, and two nuts are screwed up on the bolts to fix the two mounting brackets on the end cover of the housing.

In a class of this embodiment, the cylindrical body comprises a side wall comprising a plurality of first wire outlets; the inner plate comprises a plurality of second wire outlets matched with plurality of first wire outlets; and a power line of the motor passes through one of the plurality of first wire outlets and one of the plurality of second wire outlets successively to enter the motor controller.

In a class of this embodiment, the side plate comprises a bottom end provided with a third wire outlet.

In a class of this embodiment, the end plate comprises an outer surface provided with a plurality of heat radiating ribs.

The following advantages are associated with the direct current induced draft fan of the disclosure. The direct current induced draft fan comprises a volute, a wind wheel, a motor; and a locking assembly. The motor comprises a motor body and a motor controller. The motor is disposed on the top of the volute, and the wind wheel is disposed in the volute; the motor is configured to drive the wind wheel to rotate; the motor controller is disposed on one side of the motor body and is fixed on the motor body through the locking assembly; and the side wall of the motor controller extends from the motor body towards the volute. The motor controller is installed on one side of the motor body thus avoiding stacking the motor controller on the end of the main body of the motor. The overall space of the induced draft fan is reasonably utilized for layout, so that the overall structure of the induced draft fan is compact, effectively reducing the axial length of the induced draft fan, reducing the occupied space of the induced draft fan, and facilitating load installation.

DETAILED DESCRIPTION

Figure 1:
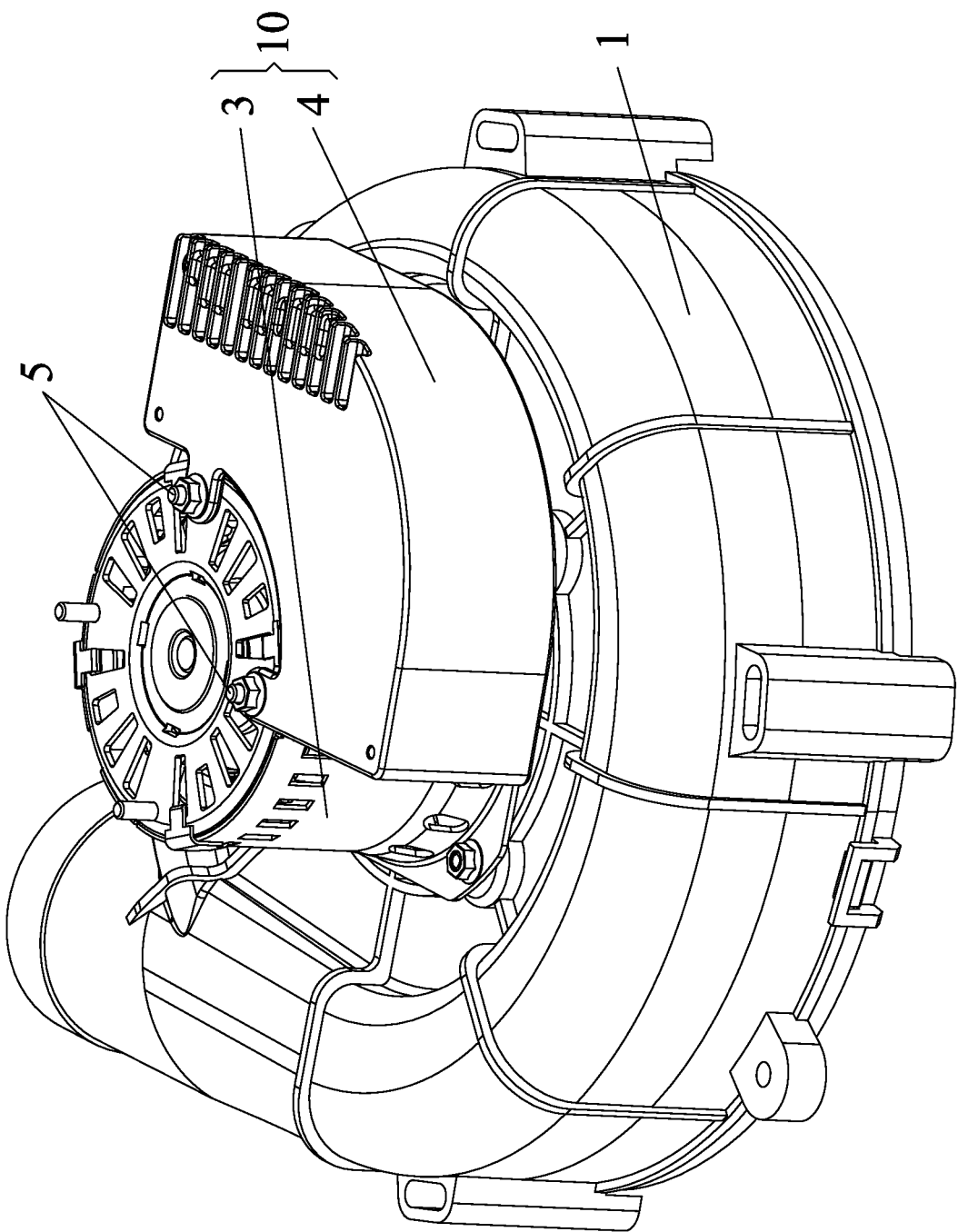
FIG. 1 is a schematic diagram of a direct current induced draft fan according to one embodiment of the disclosure.
Figure 2:
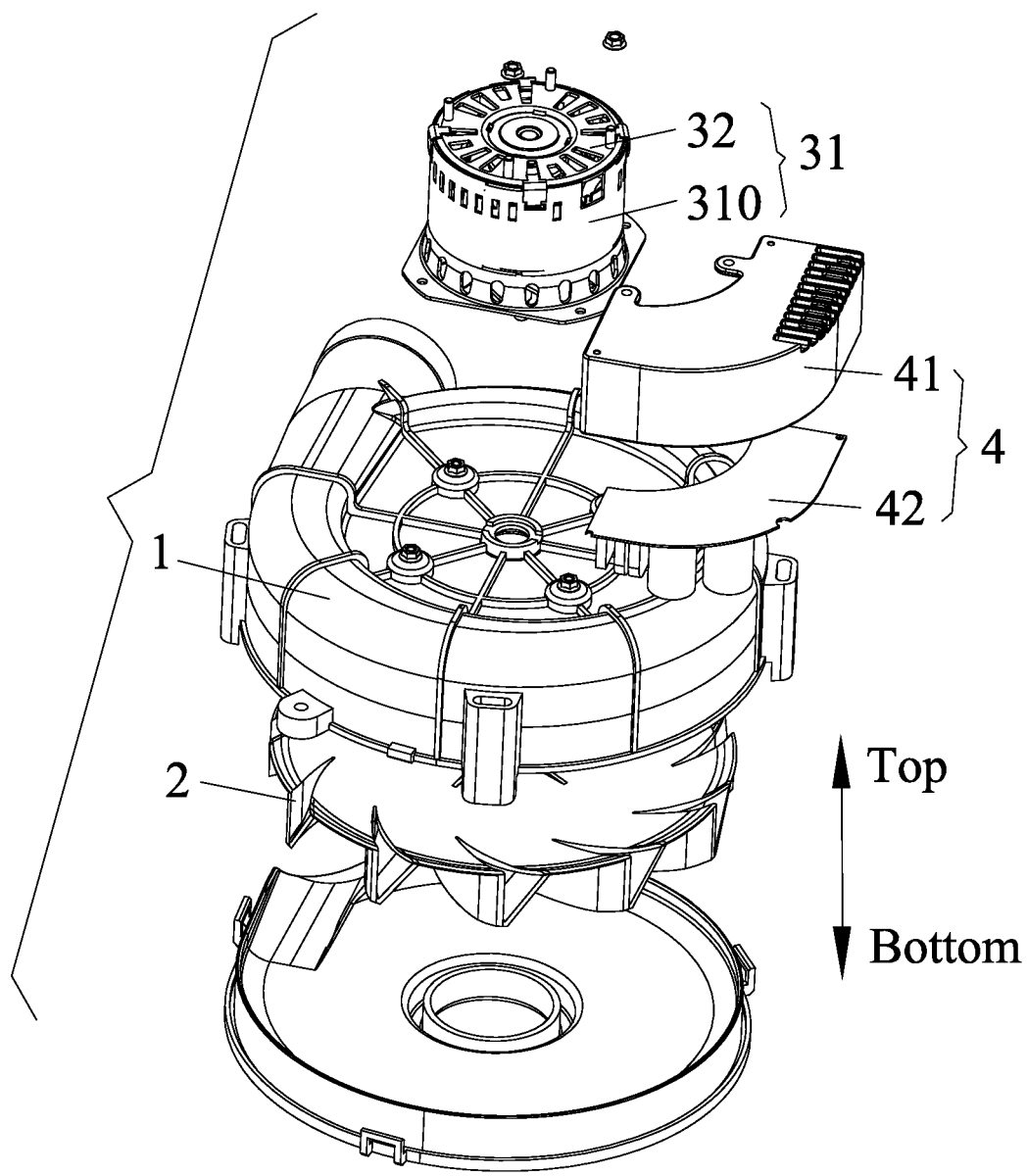
FIG. 2 is an exploded view of a direct current induced draft fan according to one embodiment of the disclosure.

To further illustrate, embodiments detailing a direct current induced draft fan are described below. It should be noted that the following embodiments are intended to describe and not to limit the disclosure.

As shown in FIGS. 1-7, the direct current induced draft fan comprises a volute 1, a wind wheel 2, a motor 10; and a locking assembly 5. The motor 10 comprises a motor body 3 and a motor controller 4. The motor 10 is disposed on the top of the volute 1, and the wind wheel 2 is disposed in the volute 1; the motor 10 is configured to drive the wind wheel 2 to rotate; the motor controller 4 is disposed on one side of the motor body 3 and is fixed on the motor body 3 through the locking assembly 5; and the side wall of the motor controller 4 extends from the motor body to the volute 1. The motor controller 4 is installed on one side of the motor body 3 thus avoiding stacking the motor controller 4 on the end of the main body of the motor 10. The overall space of the induced draft fan is reasonably utilized for layout, so that the overall structure of the induced draft fan is compact, effectively reducing the axial length of the induced draft fan, reducing the occupied space of the induced draft fan, and facilitating load installation.

The motor body 3 comprises a stator assembly 35, a rotor assembly 33, a rotating shaft 34, and a housing 31; the rotor assembly 33 is disposed on the rotating shaft 34; the stator assembly 35 is nested in the housing 31; the rotor assembly 33 is nested in the stator assembly 35; the housing 31 comprises an end cover 32 on one end; and the motor controller 4 is fixed on the end cover 32 through the locking assembly 5. Without changing the main structure of the existing motors, just to change the installation position of the motor controller 4, thus reducing the axial length of the induced draft fan and facilitating the production thereof.

The motor controller 4 comprises a control box 41 and a control circuit board 42 disposed in the control box 41; the control box 41 comprises an end plate 411 and a side plate 410 extending from an outer edge of the end plate 411 along an axial direction of the rotating shaft; the end plate 411 is fixed on the end cover 32 through the locking assembly 5; and the side plate 410 extends in the direction from the end cover 32 to the volute 1. In this way, the axial length of the induced draft fan is reduced, facilitating the installation thereof.

Figure 8:
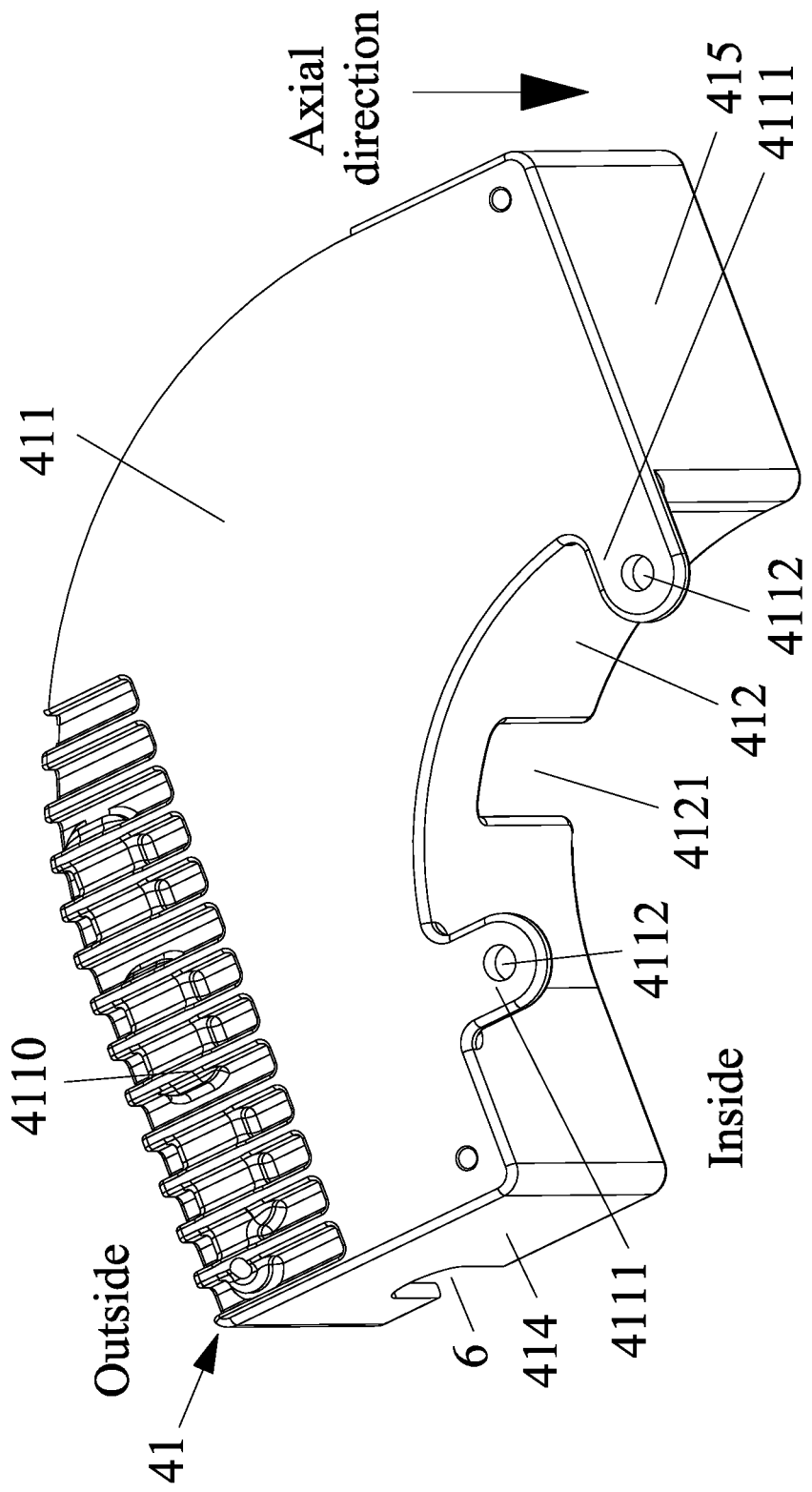
FIG. 8 is a schematic diagram of a control box according to one embodiment of the disclosure.
Figure 9:
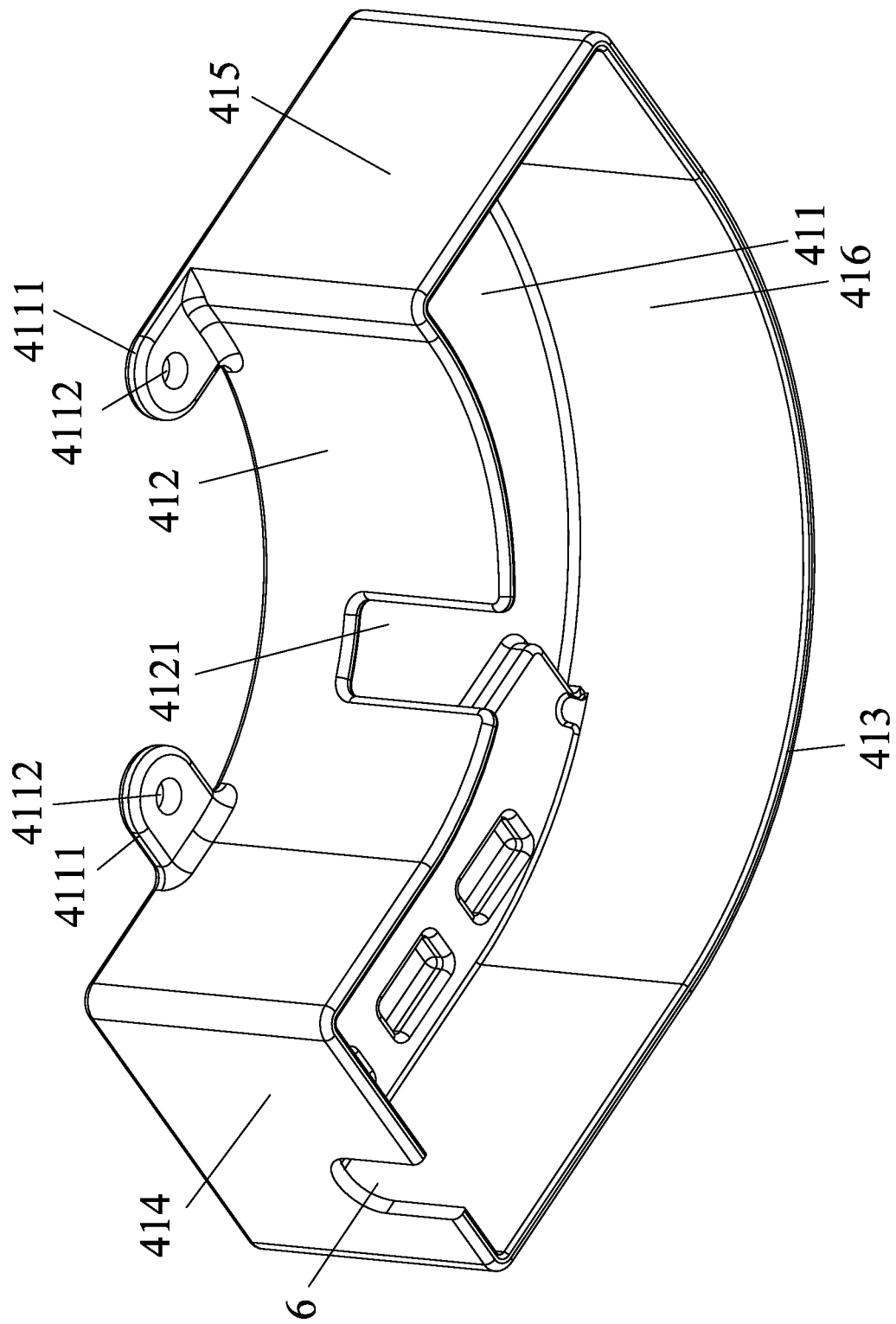
FIG. 9 is a schematic diagram of a control box according to one embodiment of the disclosure in another angle of view.

As shown in FIGS. 8 and 9, the side plate 410 comprises an inner plate 412, an outer plate 413, a first side plate 414, and a second side plate 415; the first side plate 414 is disposed between the inner plate 412 and the outer plate 413 and connects a first end of the inner plate 412 and a first end of the outer plate 413; the second side plate 415 is disposed between the inner plate 412 and the outer plate 413 and connects a second end of the inner plate 412 and a second end of the outer plate 413; the end plate 411, the inner plate 412, the outer plate 413, the first side plate 414, and the second side plate 415 form a cavity 416; and the control circuit board 42 is disposed in the cavity 416 and fixed on the end plate 411.

Figure 10:
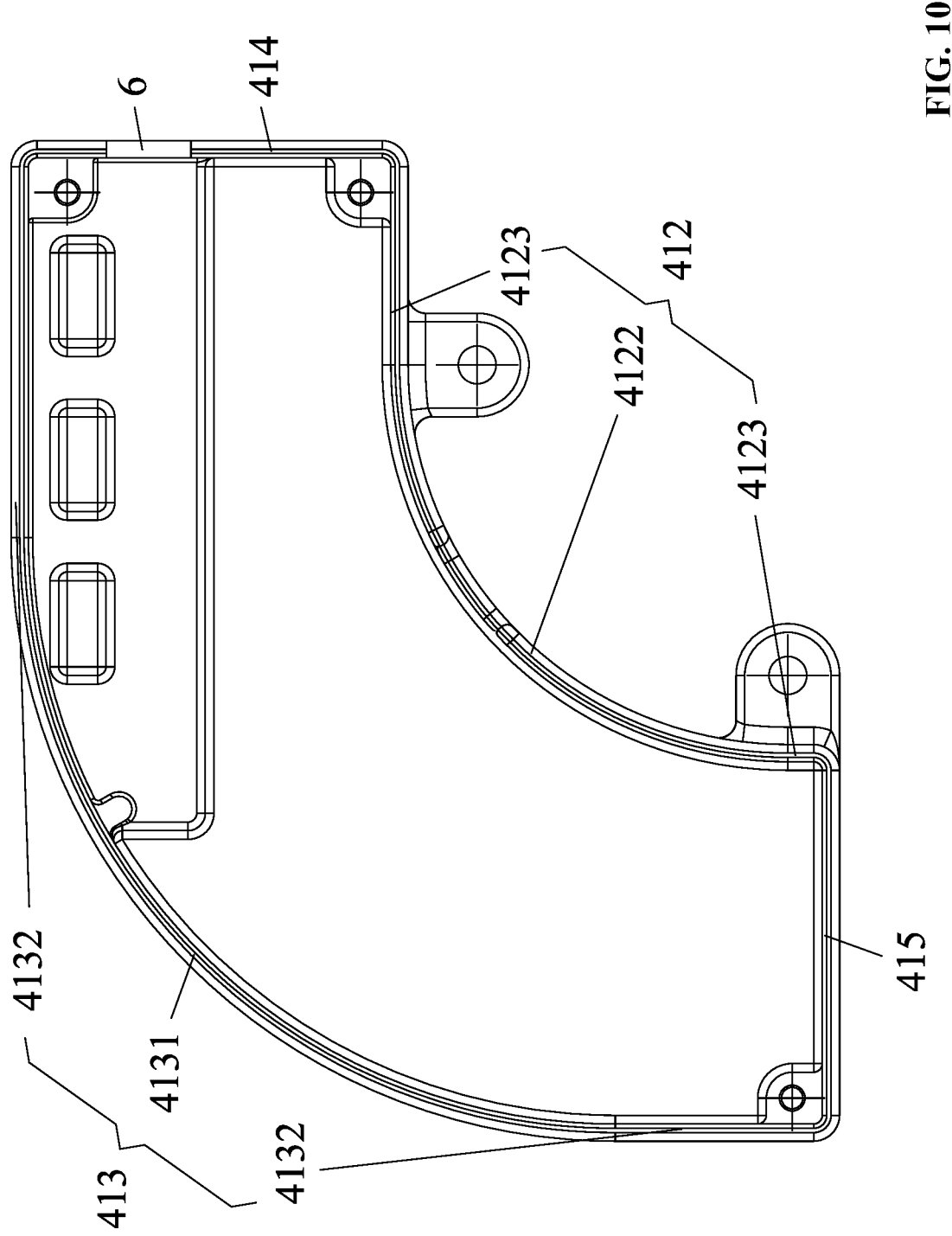
FIG. 10 is a bottom view of a control box according to one embodiment of the disclosure.

As shown in FIG. 10, the inner plate 412 comprises an inner arc segment 4122 and two inner linear segments 4123 respectively disposed on two ends of the inner arc segment 4122; the housing 31 further comprises a cylindrical body 310, and the end cover 32 is disposed on one end of the cylindrical body 310; and the inner arc segment 4122 abuts against the cylindrical body 310. The outer plate 413 comprises an outer arc segment 4131 and two outer linear segments 4132 respectively disposed on two ends of the outer arc segment 4131; and the outer plate 413 surrounds the inner plate 412. This facilitates the integral forming of the control box 41.

Figure 3:
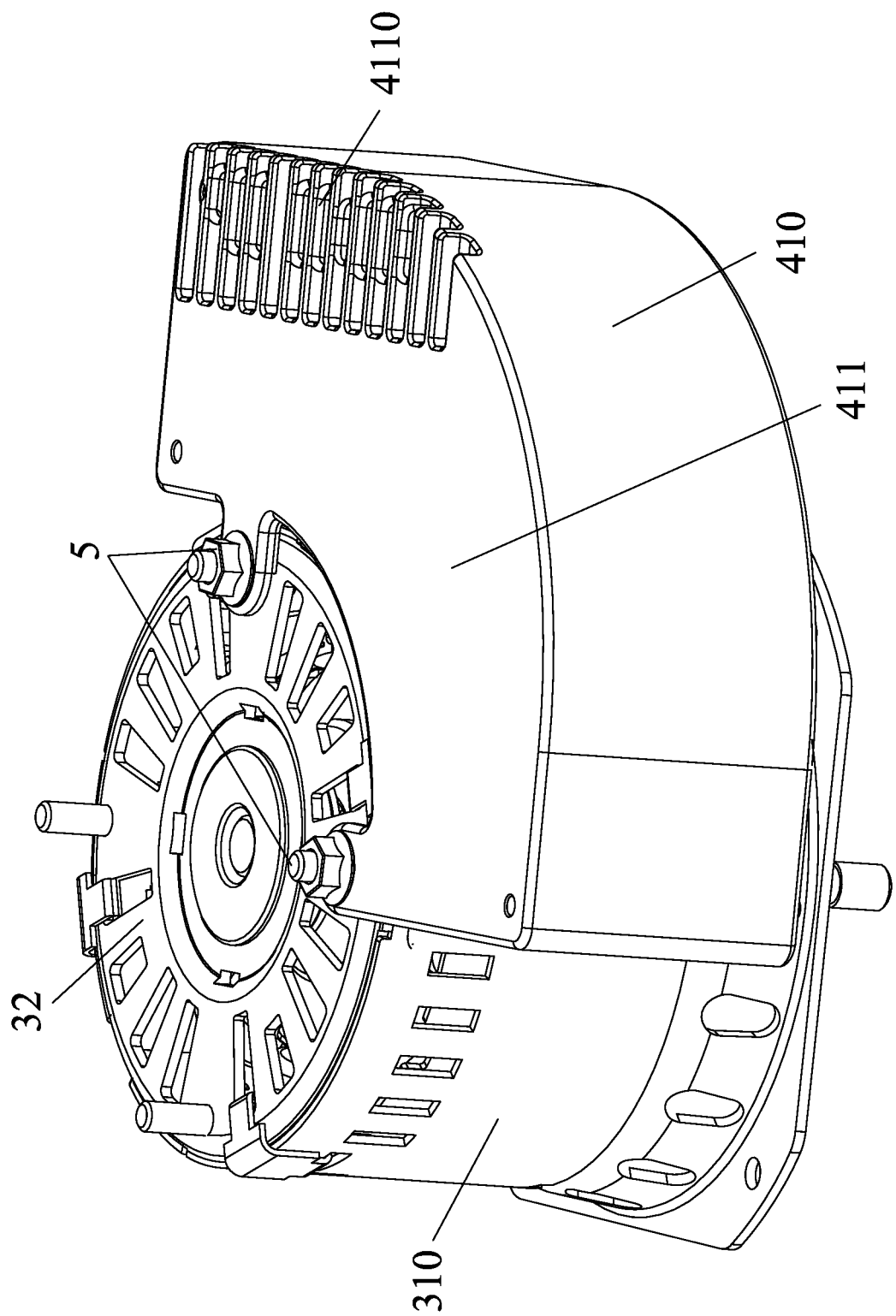
FIG. 3 is a schematic diagram of a motor according to one embodiment of the disclosure.
Figure 4:
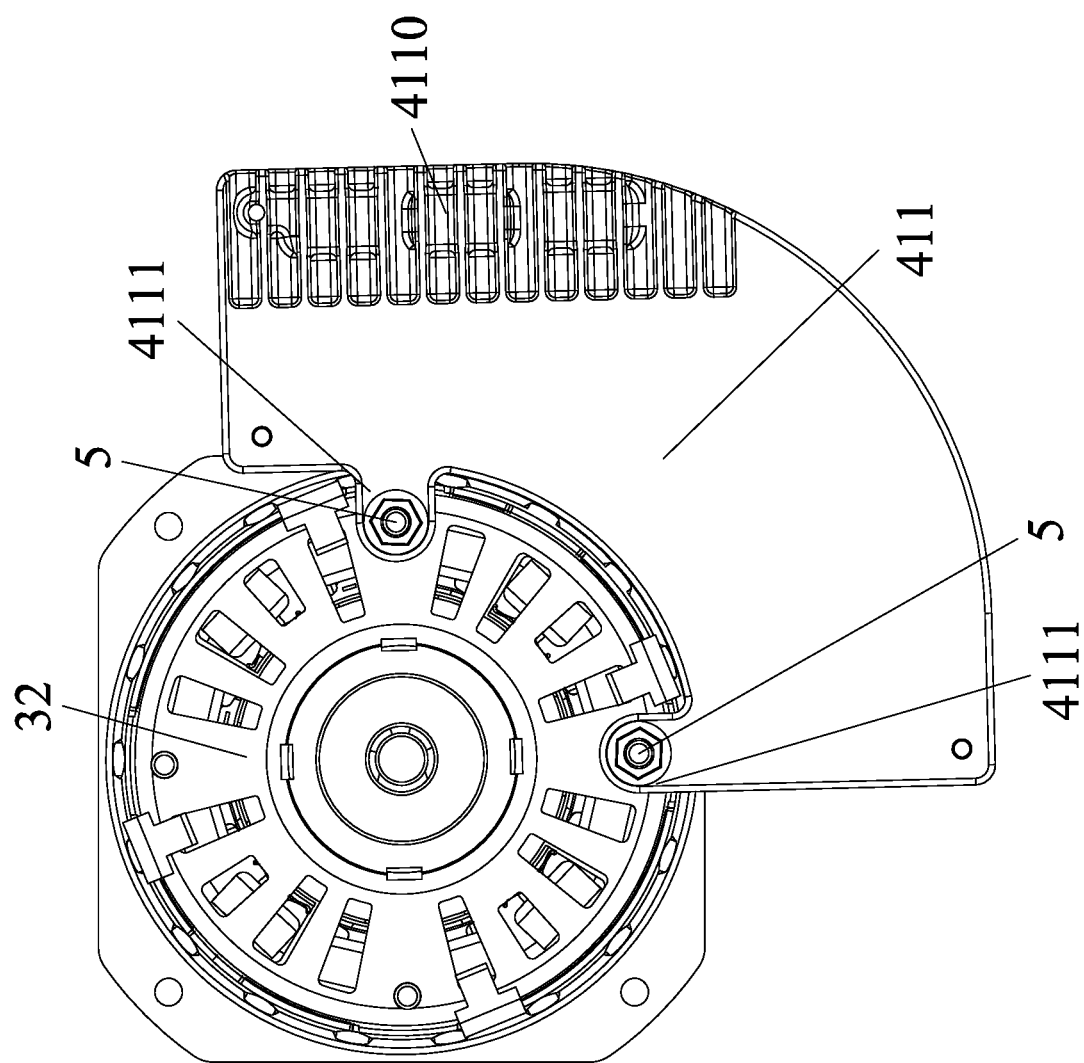
FIG. 4 is a top view of a motor according to one embodiment of the disclosure.
Figure 5:
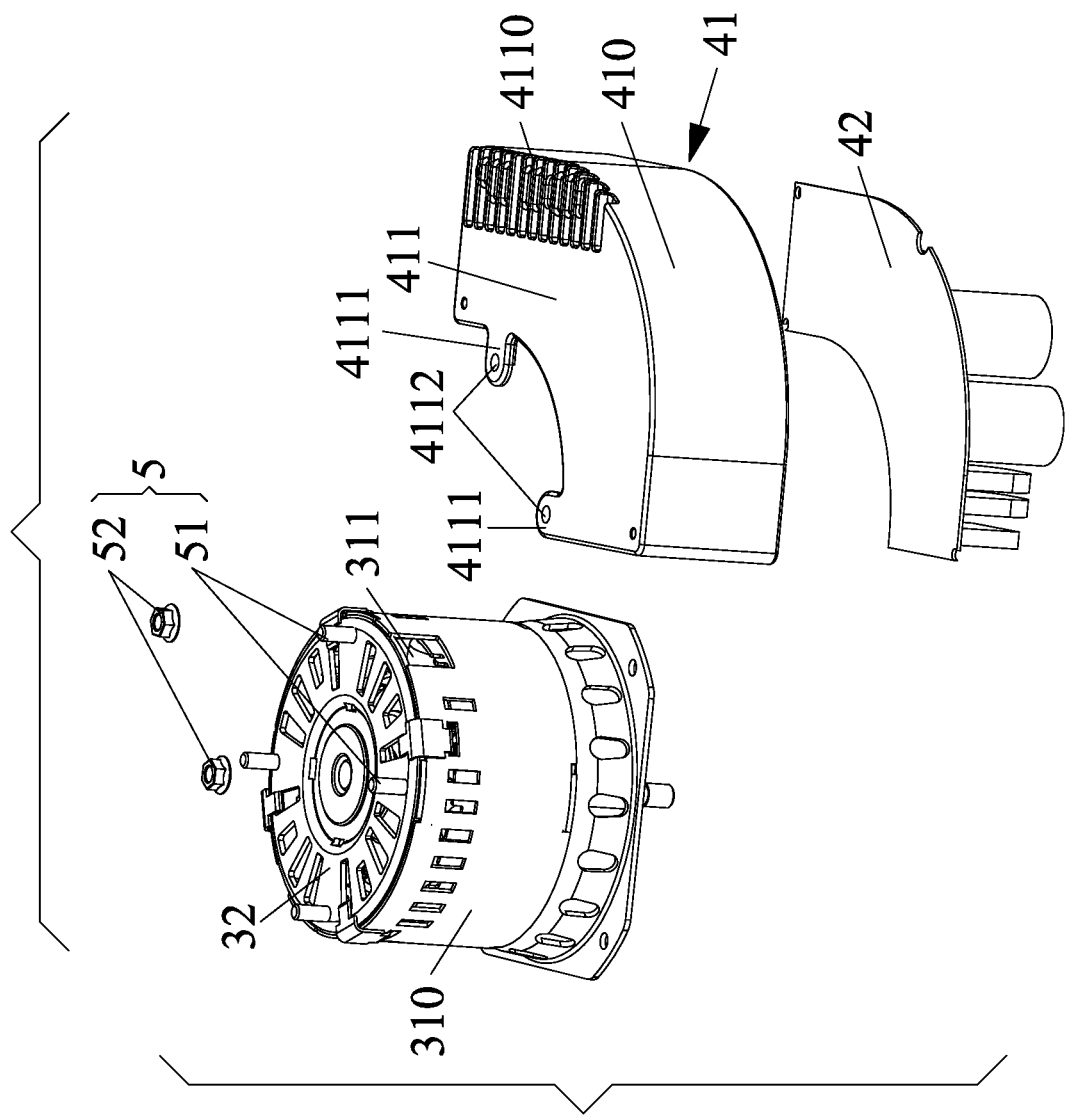
FIG. 5 is an exploded view of a motor according to one embodiment of the disclosure.
Figure 6:
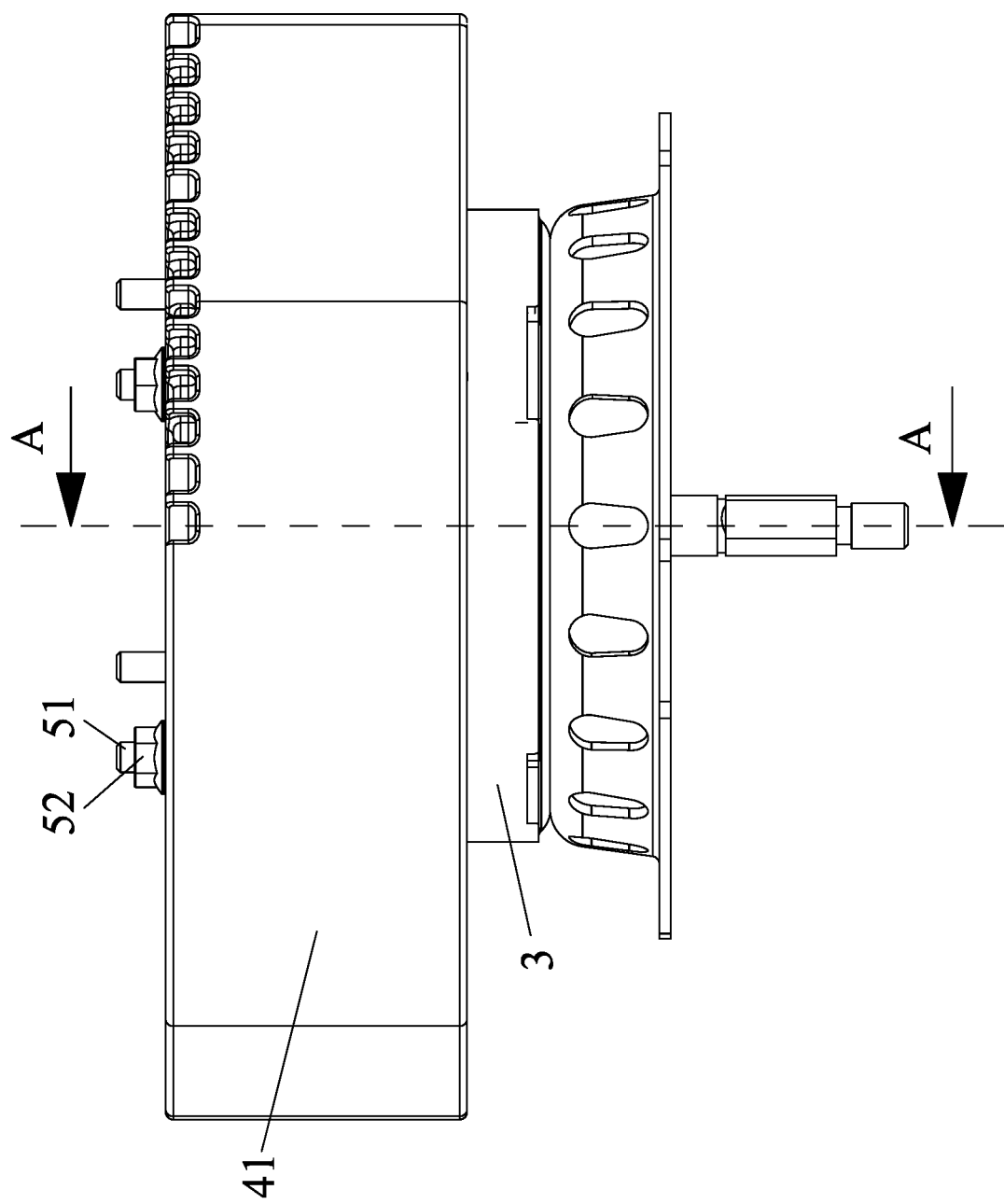
FIG. 6 is a front view of a motor according to one embodiment of the disclosure.

As shown in FIGS. 3, 4 and 5, the end plate 411 comprises two mounting brackets 4111; the two mounting brackets 4111 protrude from the inner plate 412; each mounting bracket comprises a mounting hole 4112; the locking assembly 5 comprises a plurality of bolts 51 and a plurality of nuts 52 in threaded connection to the plurality of bolts 51; to fix the control box 41 on the housing 31, two bolts 51 pass through two mounting holes, and two nuts are screwed up on the bolts 51 to fix the two mounting brackets 4111 on the end cover 32 of the housing 31. In this way, the motor controller 4 is easy to install and dismount, facilitating the maintenance thereof.

Figure 7:
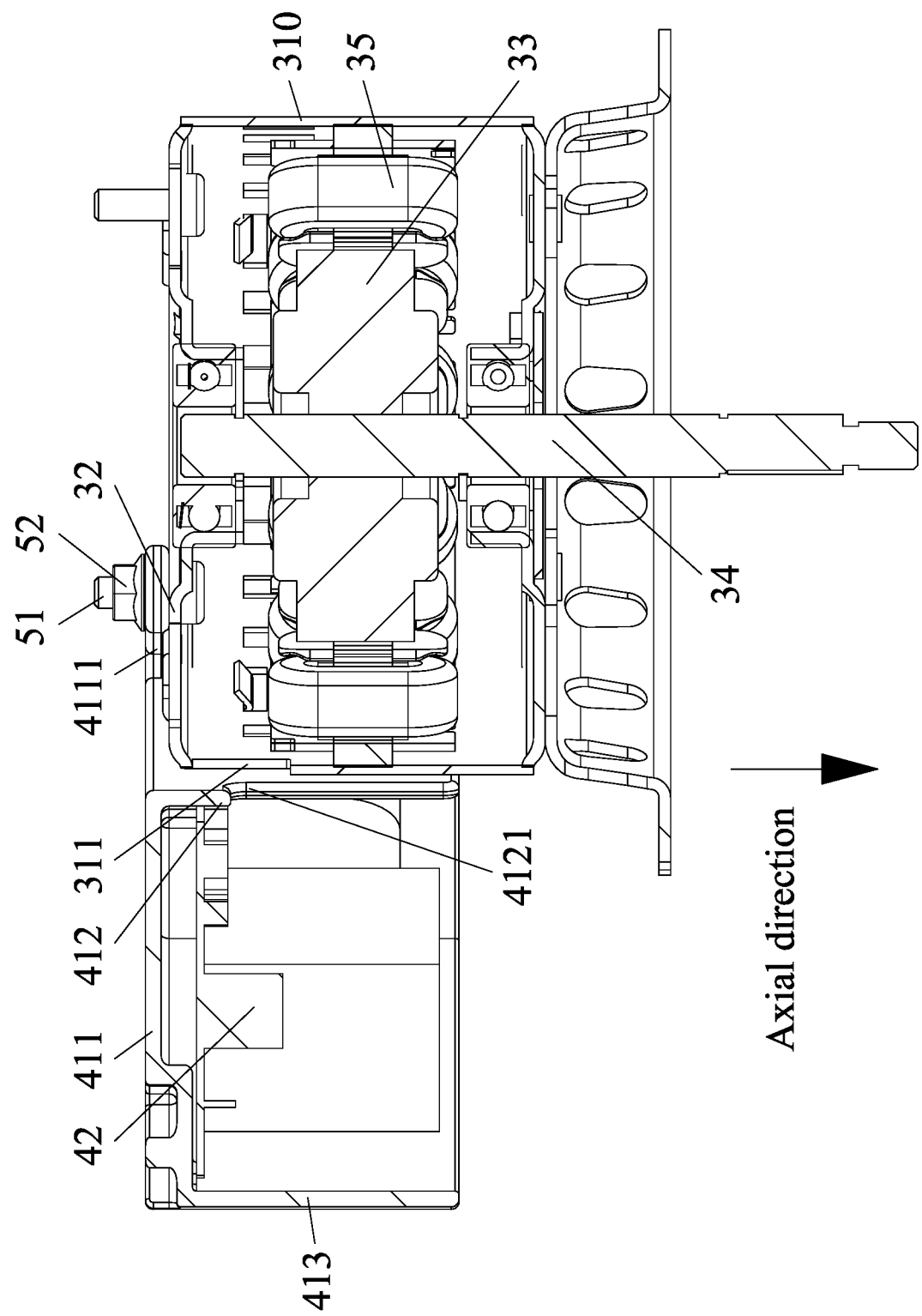
FIG. 7 is a sectional view of a motor taken from line A-A in FIG. 6.

As shown in FIGS. 5 and 7, the cylindrical body 310 comprises a side wall comprising a plurality of first wire outlets 311; the inner plate 412 comprises a plurality of second wire outlets 4121 matched with plurality of first wire outlets 311; and a power line of the motor 10 passes through one of the plurality of first wire outlets 311 and one of the plurality of second wire outlets 4121 successively to enter the motor controller 4. The wiring is convenient and fast, saving the costs.

As shown in FIGS. 8 and 9, side plate 410 comprises a bottom end provided with a third wire outlet 6. Specifically, the third wire outlet 6 is disposed on the first side plate 414, which is convenient to lead the wires inside the motor controller 4 outside, so that the motor controller 4 can be electrically connected to an external load, and the wiring is convenient and fast. In addition to disposing the third wire outlet 6 on the first side plate 414, the third wire outlet 6 can also be disposed on the outer plate 413 or the second side plate 415, which can be adjusted according to the actual installation requirements. Optionally, to prevent the wiring from being affected by the installation angle and installation position of the motor controller 4, the third wire outlet 6 can also be disposed on the outer plate 413, the first side plate 414 and the second side plate 415.

The end plate 411 comprises an outer surface provided with a plurality of heat radiating ribs 4110. The heating elements (such as IGBT element) on the control circuit board 42 correspond to the heat radiating ribs 4110 in position and are attached to the inner surface of the end plate 411, which is conducive to controlling the heat dissipation of the circuit board 42, thus effectively improving the heat dissipation function of the motor controller.

It will be obvious to those skilled in the art that changes and modifications may be made, and therefore, the aim in the appended claims is to cover all such changes and modifications.

What is claimed is:

1. A direct current induced draft fan, comprising:
   a volute;
   a wind wheel;
   a motor comprising a motor body and a motor controller; and
   a locking assembly;
   wherein:
   the motor is disposed on a top of the volute, and the wind wheel is disposed in the volute;
   the motor is configured to drive the wind wheel to rotate;
   the motor controller is disposed on one side of the motor body and is fixed on the motor body through the locking assembly;
   a side plate of the motor controller extends from the motor body to the volute;
   the motor body comprises a stator assembly, a rotor assembly, a rotating shaft, and a housing; the rotor assembly is disposed on the rotating shaft; the stator assembly is nested in the housing; the rotor assembly is nested in the stator assembly; the housing comprises an end cover on one end; and the motor controller is fixed on the end cover through the locking assembly;
   the motor controller comprises a control box and a control circuit board disposed in the control box; the control box comprises an end plate and the side plate extending from an outer edge of the end plate along an axial direction of the rotating shaft; the end plate is fixed on the end cover through the locking assembly; and the side plate extends in a direction from the end cover to the volute;
   the side plate comprises an inner plate, an outer plate, a first side plate, and a second side plate; the first side plate is disposed between the inner plate and the outer plate and connects a first end of the inner plate and a first end of the outer plate; the second side plate is disposed between the inner plate and the outer plate and connects a second end of the inner plate and a second end of the outer plate; the end plate, the inner plate, the outer plate, the first side plate, and the second side plate form a cavity; and the control circuit board is disposed in the cavity and fixed on the end plate; and
   the inner plate comprises an inner arc segment and two inner linear segments respectively disposed on two ends of the inner arc segment; the housing further comprises a cylindrical body, and the end cover is disposed on one end of the cylindrical body; and the inner arc segment abuts against the cylindrical body.

2. The fan of claim 1, wherein the outer plate comprises an outer arc segment and two outer linear segments respectively disposed on two ends of the outer arc segment; and the outer plate surrounds the inner plate.

3. The fan of claim 1, wherein the end plate comprises two mounting brackets; the two mounting brackets protrude from the inner plate; each mounting bracket comprises a mounting hole; the locking assembly comprises a plurality of bolts and a plurality of nuts in threaded connection to the plurality of bolts; to fix the control box on the housing, two bolts pass through two mounting holes, and two nuts are screwed up on the bolts to fix the two mounting brackets on the end cover of the housing.

4. The fan of claim 3, wherein the cylindrical body comprises a side wall comprising a plurality of first wire outlets; the inner plate comprises a plurality of second wire outlets matched with the plurality of first wire outlets; and a power line of the motor passes through one of the plurality of first wire outlets and one of the plurality of second wire outlets successively to enter the motor controller.

5. The fan of claim 3, wherein the side plate comprises a bottom end provided with a third wire outlet.

6. The fan of claim 5, wherein the end plate comprises an outer surface provided with a plurality of heat radiating ribs.

* * * * *